United States Patent [19]
Higgins

[11] 4,040,544
[45] Aug. 9, 1977

[54] MATERIAL DISPENSER WITH SNAP-ACTING OUTLET VALVE

[75] Inventor: David Higgins, Stratford upon Avon, England

[73] Assignee: William Ernest Golcher, Walsall, England

[21] Appl. No.: 650,845

[22] Filed: Jan. 21, 1976

[30] Foreign Application Priority Data
July 19, 1975 United Kingdom .............. 30356/75

[51] Int. Cl.² ........................................... B65D 47/20
[52] U.S. Cl. .................................... 222/477; 222/498; 222/508

[58] Field of Search ............... 222/228, 232, 426, 427, 222/448-452, 477, 498, 505, 508, 511, 406, 407

[56] References Cited
U.S. PATENT DOCUMENTS
3,272,399  7/1976  Dight ............................. 222/498 X Primary Examiner—Robert B. Reeves
Assistant Examiner—David A. Scherbel

[57] ABSTRACT

A material dispensing device having a discharge spout, passage of material through the spout being controlled by a curved blade spring which is operable to snap between two positions in each of which it co-operates with an obturating member in closing the spout.

10 Claims, 3 Drawing Figures

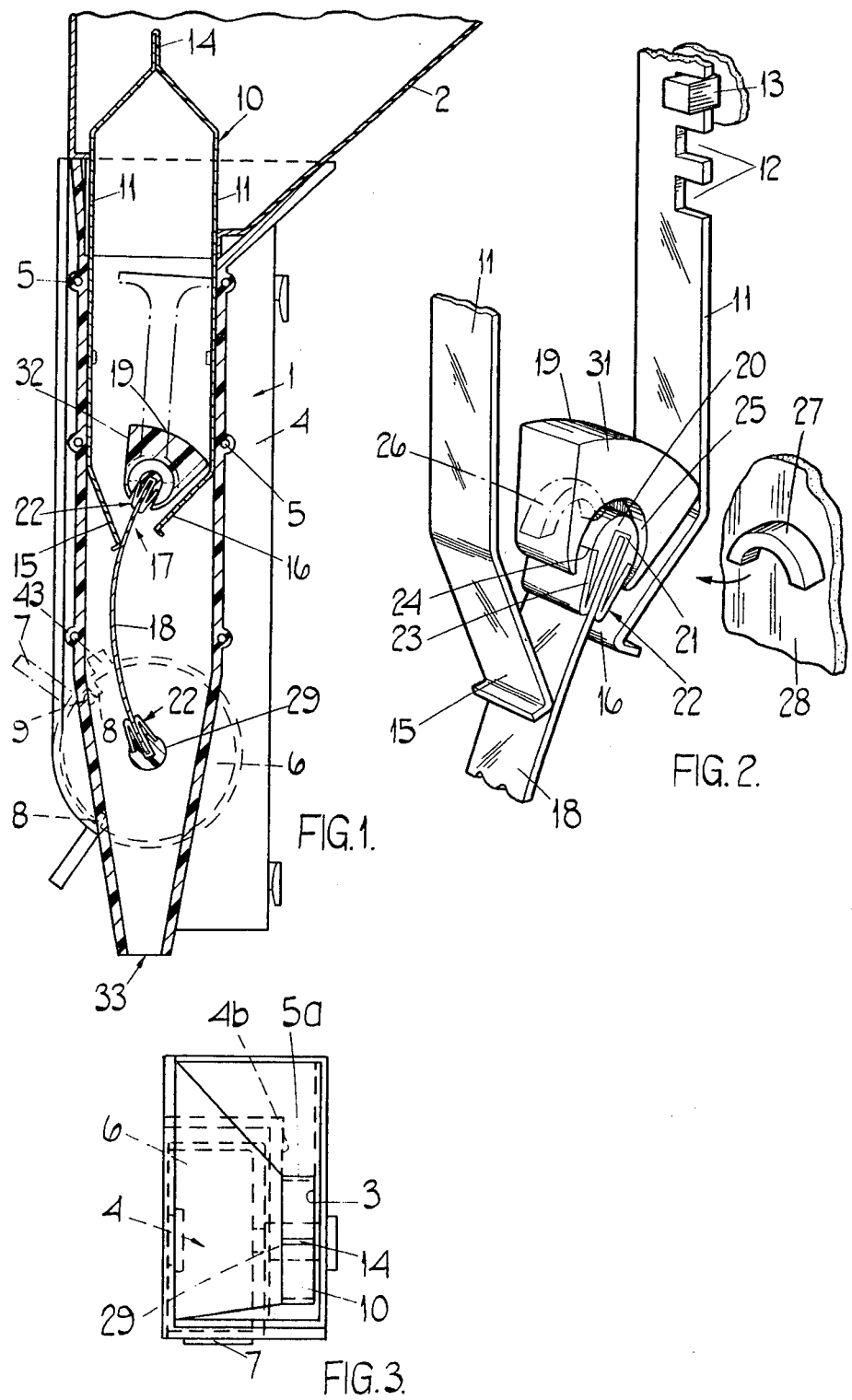

MATERIAL DISPENSER WITH SNAP-ACTING OUTLET VALVE

This invention relates to apparatus for dispensing quantities of pourable material in solid or liquid form and is principally concerned with dispensing powered ingredients for making beverages such as tea and coffee.

An object of the invention is to provide an improved dispensing apparatus in simple and convenient form.

According to the invention, a dispensing apparatus comprises a container having an outlet spout, a curved blade spring mounted with respect to the spout and disposed so as to act at least partially to close the spout when in one extreme position of curvature, the blade spring being connected to operating means and the arrangement being such that movement of said operating means in one or the other of two opposed directions will cause the curvature of blade to change so that a position is reached from which the blade moves rapidly to another extreme position of curvature in which it again at least partially closes the spout.

In one convenient arrangement, one end of the blade spring is connected to a valve element which moves simultaneously with and in the opposite direction to the blade spring to alternative positions in which it completes the closure of the spout.

The valve element is preferably pivotally mounted about a transverse axis of the spout.

Preferably an opening of the spout is defined by a pair of opposed resilient elements for engagement alternatively by the blade spring at its extreme positions of curvature to at least partially close the spout. The resilient elements may be adjustable longitudinally of the spout.

The resilient elements may conveniently be the free end portions, preferably inclined towards each other, of the respective arms of a generally U-shaped resilient element, at least one of the arms being notched for co-operation with one or more projections on an adjacent wall whereby said adjustment is obtained by engaging the notches with alternative ones of the projections.

The invention will now be described, by way of example, with reference to the accompanying drawings in which:

FIG. 1 is a part-sectional elevation of one form of dispenser of the invention;

FIG. 2 is an exploded view, partly broken away, of part of the dispenser of FIG. 1, and FIG. 3 is a plan view of the device of FIG. 1.

Referring to FIGS. 1 to 3 of the drawings, there is shown a dispenser for granular flowable materials, such as tea or coffee, having a body 1, into the upper end portion of which is retained, by a push fit, a hopper 2. The body has a spout 3 of rectangular cross-section and an adjacent compartment 4 of rectangular but larger cross-section. The portions of the body forming the spout 3 and compartment 4 are separate mouldings of plastics material joined together by screws 5. Flanges 5a of the spout body abut an adjacent wall 4b of the compartment in order to define the complete spout.

Mounted for angular movement within the lower portion of the compartment 4 is a control cylinder 6 having an operating lever 7, the limits of the angular movement of the cylinder being defined by a pair of peripherally spaced lugs 8 on a wall of the cylinder which are engaged alternatively by a peg 9 on the body.

In an upper portion of the spout is mounted a resilient generally U-shaped element 10, the arms 11 of which are provided with a series of notches 12 for engagement alternatively with projections 13 on opposed walls of the spout to permit adjustment of the position of the element longitudinally of the spout. This is effected by deforming the arms 11 inwardly towards each other to disengage one pair of notches from the projections and permit another pair of notches to be engaged after the desired longitudinal movement has been effected. The joined end portions of the arms 11 form a knife portion 14 arranged to puncture a sealed bag, sealed hopper or the like of material pushed into the hopper to permit the contents to flow therefrom. The lower end portions 15, 16 of the arms 11 form a pair of resilient elements which define an opening 17 within the spout. This opening is controlled by an arcuate blade spring 18, one end of which is connected to a valve element, shown as a block 19, which is pivotally mounted within the spout and arranged to seal alternatively against one arm or the other of the arms 11 of the element 10. The spring 18 engages the elements 15 and 16 alternatively in its two extreme positions of curvature so as to form a seal therewith, the element engaged always being that opposed to the arm 11 engaged by the block 19.

The mounting of the block 19 within the spout and its connection with the blade spring 18 is shown in more detail in FIG. 2. The block 19 has a central boss 20 having a diametral slot within which is resiliently held the central portion 21 of a generally W-shaped resilient connecting element 22, the outer arms 23 of which are lodged against shoulders 24 of the boss. Each side of the block is cut away around the boss to form part-annular grooves 25, by means of which the block is pivotally mounted on a pair of complementary arcuate projections 26, 27 on opposed walls of the spout. The projection 27, and its corresponding wall 28 are shown in FIG. 2 turned through 90° from their normal positions, for the sake of clarity. The cylinder has a co-axial projecting boss 29 adapted to receive a further connecting element 22 for connecting the spring 18 to the cylinder 6.

The thickness of the block 19 is such that its sides 31 fit closely against opposed walls of the spout 3. It will be appreciated that the space defined between the edge 32 of the block 19, the adjacent arm 11, the element 15 and blade spring 18 defines a metering chamber which fills with material when the dispenser is charged. Charging may be effected either by filling the hopper 2 with loose material or inserting into the body a sealed hopper, a surface of which is pierced by the knife portion 14 upon insertion, permitting the material to enter the spout 3.

In order to dispense a quantity of material from the apparatus, the handle 7 is moved from its position shown in full lines to its alternative position shown in broken lines, thereby producing angular movement of the cylinder 6 and causing the blade spring 18 to deform in a direction away from the element 15, thereby changing the curvature of the blade. The initial change in curvature occurs mainly in the lower portion of the blade so that the blade does not immediately become disengaged from the element 15. When a certain degree of deformation has occurred, the blade will move rapidly from the position shown in the drawings to an oppositely curved position in which it engages the resilient element 16, and the block 19 will pivot from its position shown to a position in which it engages the opposite arm 11. During this actuation of the spring and block, the material contained in the space referred to above will fall through the opening 17 and be discharged from an outlet 33 of the spout. A corresponding space at the other side of the spout will then fill with material, and this will be discharged when the lever is returned to the position shown in full lines. The use of the resilient elements 15 and 16 for engagement with the blade spring 18 has been found to produce an excellent seal for the opening 17.

It will be appreciated that the amount of material dispensed for each throw of the lever 7 can be varied, within predetermined limits, by adjusting the position of the U-shaped element 10 longitudinally of the spout, in the manner described above, in order to increase or decrease the size of the metering space. This simple arrangement provides considerable flexability of use of the apparatus since it can be adjusted to deal with a variety of requirements.

The apparatus of the invention may be conveniently adapted for use with a variety of coin-freed mechanisms and the cylinder 6 may be provided with an interlock device to prevent its actuation until a previous operation, such as insertion of a coin in an appropriate mechanism, has taken place. Such an interlock device may conveniently be an electrically operated plunger or the like for co-operation with a projection 43 on the cylinder to retain the handle in each of its extreme positions, either at each actuation or for every predetermined number of actuations, thereby ensuring that only one quantity of material (or a predetermined number of successive quantities) can be dispensed for a given payment.

It is envisaged that electrical or electronic control equipment may be housed within the compartment 4.

In addition to the adjustment provided by the movable element 10, it is possible further to vary the size of the metering space by using different shapes of block 19. One alternative form of block which could be used to increase the metering space is shown in dotted lines in FIG. 1.

It will be appreciated that the blade spring may be actuated by a linearly operated mechanism in place of the rotary mechanism described.

I claim:

1. A dispensing apparatus comprising a container for material to be dispensed, an outlet spout from said container through which a quantity of material to be dispensed can be discharged, valve means including a curved blade spring movable across the spout between first and second positions in each of which it partially closes the spout, and a valve element connected to the blade spring and movable simultaneously therewith across the spout in a generally opposite direction to the spring between first and second positions in each of which it completes closure of the spout, and operating means connected to the blade spring and operable to deform the blade spring in a direction away from one towards the other of its first and second positions until the blade spring reaches a position from which it snaps rapidly across the spout to its said other position, causing simultaneous movement of the valve element to the other of the valve element positions, whereby a quantity of material is able to pass through the spout during movement of the spring and element thereacross.

2. Apparatus according to claim 1 wherein the operating means is pivotally mounted with respect to the spout.

3. Apparatus according to claim 1 wherein the valve element is pivotally mounted about a transverse axis of the spout.

4. Apparatus according to claim 3 wherein the operating means is pivotally mounted with respect to the spout about an axis parallel to the valve element pivotal axis.

5. Apparatus according to claim 1 further comprising a pair of opposed resilient elements defining an opening of the spout, said resilient elements being engaged alternatively by the blade spring when the latter is respectively in its first and second positions.

6. Apparatus according to claim 5 wherein the resilient elements are adjustable longitudinally of the spout.

7. Apparatus according to claim 5 further comprising a generally U-shaped resilient member having a pair of arms, respective free end portions of the arms forming said resilient elements.

8. Apparatus according to claim 7, wherein the arms have notches therein, at least one projection being provided on an adjacent wall of the apparatus adjacent each arm for co-operation with the notches, whereby adjustment of the elements is obtained by engaging the notches selectively with said at least one projection.

9. Apparatus according to claim 7 wherein the arms of the U-shaped element form a junction having a sharp edge upon which a sealed bag of material pushed into the container may be ruptured to permit the contents to flow towards the spout.

10. Apparatus according to claim 1 wherein the valve element is a block, the sides of which fit closely against opposed walls of the spout.

* * * * *